United States Patent
Durham et al.

(10) Patent No.: US 10,235,304 B2
(45) Date of Patent: Mar. 19, 2019

(54) MULTI-CRYPTO-COLOR-GROUP VM/ENCLAVE MEMORY INTEGRITY METHOD AND APPARATUS

(71) Applicant: Intel Corporation, Santa Clara, CA (US)

(72) Inventors: David M. Durham, Beaverton, OR (US); Siddhartha Chhabra, Hillsboro, OR (US); Serge J. Deutsch, Hillsboro, OR (US); Michael E. Kounavis, Portland, OR (US); Alpa T. Narendra Trivedi, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 174 days.

(21) Appl. No.: 15/283,339

(22) Filed: Oct. 1, 2016

(65) Prior Publication Data

US 2018/0095899 A1    Apr. 5, 2018

(51) Int. Cl.
*G06F 21/00* (2013.01)
*G06F 12/14* (2006.01)
(Continued)

(52) U.S. Cl.
CPC ...... *G06F 12/1408* (2013.01); *G06F 12/0831* (2013.01); *G06F 12/128* (2013.01); *G06F 12/1475* (2013.01); *G06F 2212/1052* (2013.01); *G06F 2212/621* (2013.01); *G06F 2212/69* (2013.01)

(58) Field of Classification Search
None
See application file for complete search history.

(56) References Cited

U.S. PATENT DOCUMENTS 6,272,537 B1 * 8/2001 Kekic .................. G06F 8/34
709/203
6,289,382 B1 * 9/2001 Bowman-Amuah ..................
G06F 13/387
709/226

(Continued)

FOREIGN PATENT DOCUMENTS

KR  10-2016-0093702 A  8/2016
WO  WO2014-055136 A1  4/2014

OTHER PUBLICATIONS

You, Ilsun; Catuogno, Luigi; Castiglione, Aniello; Cattaneo, Giuseppe. On Asynchronous Enforcement of Security Policies in "Nomadic" Storage Facilities. 2013 IEEE International Symposium on Industrial Electronics (ISIE). Pub. Date: 2013. https://ieeexplore.ieee.org/stamp/stamp.jsp?tp=&arnumber=6563880&tag=1.*

(Continued)

*Primary Examiner* — Jeremiah L Avery
(74) *Attorney, Agent, or Firm* — Schwabe, Williamson & Wyatt, P.C.

(57) ABSTRACT

Embodiments of apparatus, method, and storage medium associated with MCCG memory integrity for securing/protecting memory content/data of VM or enclave are described herein. In some embodiments, an apparatus may include one or more encryption engines to encrypt a unit of data to be stored in a memory in response to a write operation from a VM or an enclave of an application, prior to storing the unit of data into the memory in an encrypted form; wherein to encrypt the unit of data, the one or more encryption engines are to encrypt the unit of data using at least a key domain selector associated with the VM or enclave, and a tweak based on a color within a color group associated with the VM or enclave. Other embodiments may be described and/or claimed.

21 Claims, 7 Drawing Sheets

(51) Int. Cl.
*G06F 12/0831* (2016.01)
*G06F 12/128* (2016.01)

(56) References Cited

U.S. PATENT DOCUMENTS

| | | | | |
|---|---|---|---|---|
| 6,332,163 | B1 * | 12/2001 | Bowman-Amuah | H04L 12/4604 709/217 |
| 6,339,832 | B1 * | 1/2002 | Bowman-Amuah | G06F 9/542 710/266 |
| 6,664,978 | B1 * | 12/2003 | Kekic | H04L 41/0213 709/203 |
| 9,213,653 | B2 | 12/2015 | Durham et al. | |
| 2002/0092019 | A1 * | 7/2002 | Marcus | G11B 27/034 725/37 |
| 2003/0191719 | A1 * | 10/2003 | Ginter | G06F 21/10 705/54 |
| 2004/0103305 | A1 * | 5/2004 | Ginter | G06F 21/10 726/27 |
| 2006/0031687 | A1 | 2/2006 | Su et al. | |
| 2011/0251992 | A1 * | 10/2011 | Bethlehem | H04L 12/2863 707/610 |
| 2013/0073388 | A1 * | 3/2013 | Heath | G06Q 30/02 705/14.53 |
| 2014/0223197 | A1 | 8/2014 | Gueron et al. | |
| 2015/0220745 | A1 | 8/2015 | Nellitheertha et al. | |
| 2017/0286525 | A1 * | 10/2017 | Li et al. | G06F 17/30551 |

OTHER PUBLICATIONS

Hosseinzadeh, Shohreh; Hyrynsalmi, Sami; Conti, Mauro; Leppanen, Ville. Security and Privacy in Cloud Computing via Obfuscation and Diversification: a Survey. 2015 IEEE 7th International Conference on Cloud Computing Technology and Science. Pub. Date: 2015. https://ieeexplore.ieee.org/stamp/stamp.jsp?tp=&arnumber=7396208.*

Teo, Lawrence; Sun, Yu-An; Ahn, Gail-Joon. Defeating Internet Attacks Using Risk Awareness and Active Honeypots. Sewcond IEEE International Information Assurance Workshop, 2004. Pub. Date: 2004. https://ieeexplore.ieee.org/stamp/stamp.jsp?tp=&arnumber=1288045.*

Vilanova, Lluis et al. CODOMs: Protecting Software with Codecentric Memory Domains. 2014 ACM/IEEE 41st International Symposium on Computer Architecture (ISCA). https://ieeexplore.ieee.org/stamp/stamp.jsp?tp=&arnumber=6853202 (Year: 2014).*

ANdo, Ruo et al. Blink: Large-scale P2P network monitoring and visualization system using VM introspection. The 6th International Conference on Networked Computing and Advanced Information Management. https://ieeexplore.ieee.org/stamp/stamp.jsp?tp=&arnumber=5572049 (Year: 2010).*

McCune, Jonathan M. et al. Shannon: A System for Distributed Mandatory Access Control. 2006 22nd Annual Computer Security Applications Conference (ACSAC '06). https://ieeexplore.ieee.org/stamp/stamp.jsp?tp=&arnumber=4041151 (Year: 2006).*

International Search Report and Written Opinion dated Dec. 11, 2017 for International Application PCT/US2017/049125, 15 pages.

Deutsch et al., "Multi-Stage Memory Integrity Method and Apparatus", U.S. Appl. No. 15/263,962, filed Sep. 13, 2016, 46 pages.

Durham et al., "Secure Public Cloud", U.S. Appl. No. 62/373,627, filed Aug. 11, 2016, 69 pages.

Chhabra et al., "Techniques for Data Storage Protection and Integrity Checking", U.S. Appl. No. 14/998,323, filed Dec. 24, 2015, 75 pages.

* cited by examiner

| Crypto Color Group1 ~ 402a | Enclave ID1 ~ 404a | Other Info ~ 406a |
|---|---|---|
| Crypto Color Group2 ~ 402b | Enclave ID2 ~ 404b | Other Info ~ 406b |
|  |  |  |
| Color Color Groupn ~ 402n | Enclave ID3  404n | Other Info ~ 406n |

400

MULTI-CRYPTO-COLOR-GROUP VM/ENCLAVE MEMORY INTEGRITY METHOD AND APPARATUS

TECHNICAL FIELD

The present disclosure relates to the fields of computing and memory integrity. More particularly, the present disclosure relates to multi-crypto-color-group (MCCG) memory integrity method and apparatus for ensuring integrity of content/data stored in memory of a computing device for a virtual machine or an enclave of an application, which may be within a virtual machine.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

In computing, a virtual machine (VM) is an emulation of a given computer system. Virtual machines operate based on the computer architecture and functions of a real or hypothetical computer.

Security, protection from malicious software, has emerged as a major concern of the computing art. It is expected that processors, e.g., some processors from Intel® Corporation of Santa Clara, Calif., will begin to provide support for isolated/protected execution environments to individual applications (also referred to as application execution enclaves or simply, enclaves). Accesses to the enclave memory areas will be limited to codes resident in the enclaves only. Codes outside the enclave will have no access to enclave memory areas. For Intel® processors, the technology is currently known as SGX (Software Guard Extensions). For further information, see Intel® Software Guard Extensions Programming Reference, dated October, 2014.

Memory encryption using key domain selectors and integrity check have been employed to protect and ensure integrity of data stored in memory. Key domain selectors are values used for annotating memory data structures for enhanced security and which participate in the memory encryption process as tweaks, effectively acting as if a different key was used to encrypt the content/data being stored into a memory. Key domain selectors associate encrypted memory content/data with specific uses, code paths, or instances of the applications which are executing, allowing different access control policies to be applied to different software domains. Using key domain selectors, systems can offer increased protection against a range of corruption events and attacks that include software bug-related corruption events (e.g., Use-After-Free, UAF), buffer overflow attacks, physical attacks on memory, and malware attacks including inappropriate memory accesses due to return oriented programming (ROP) injected malware, among others. Key domain selector sizes can range from few bits (1, 2) to large numbers of bits (e.g., 32, 64 or 128).

Among the range of corruption events and attacks, replay attack is particularly difficult to protect against. Prior approaches such as having a replay tree in memory that is searched on every memory access (a worst case scenario), or maintaining state across time, potentially create high memory overhead or limit enclave size, and reduce performance.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
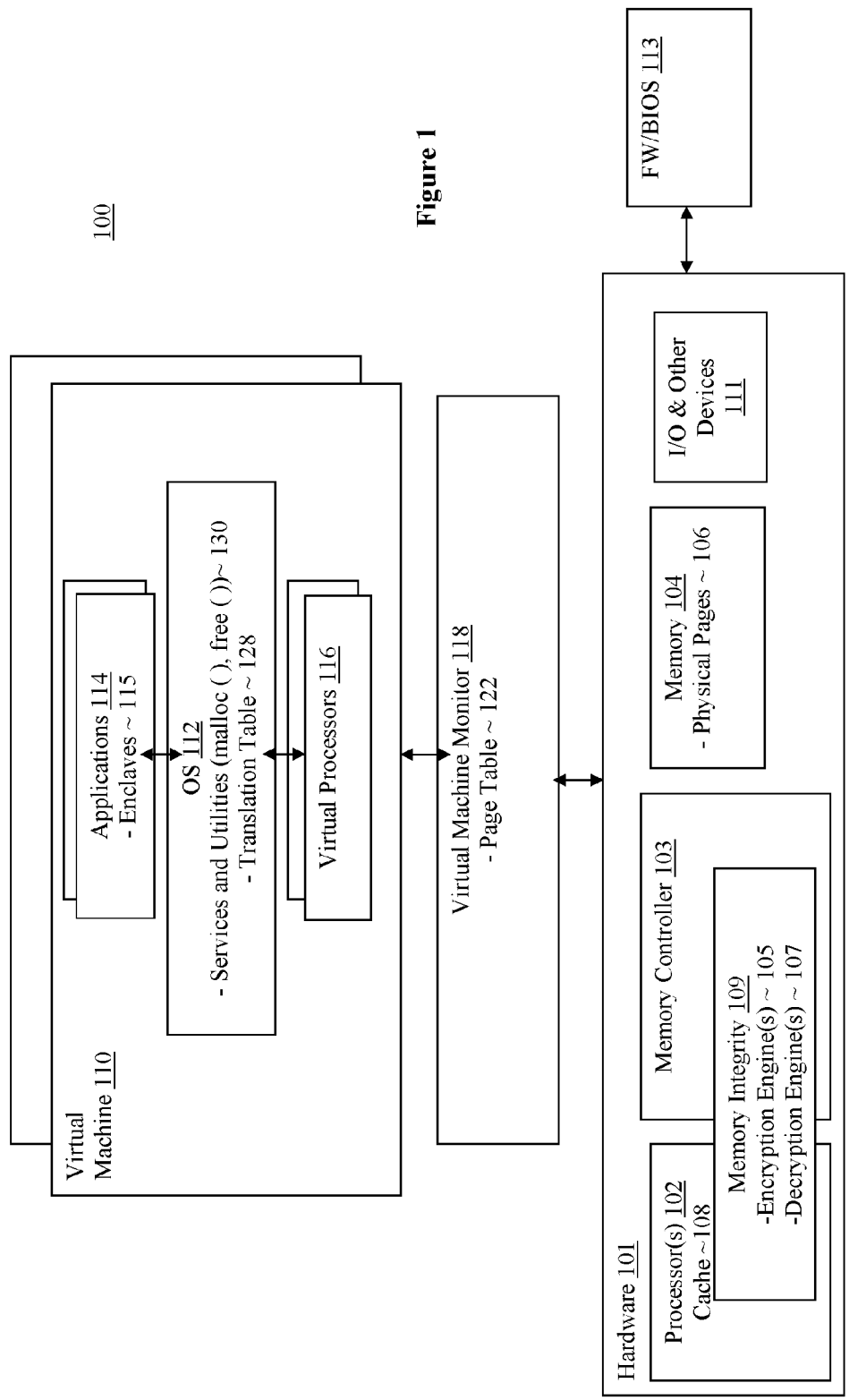
FIG. 1 illustrates an example computer device having the MCCG memory integrity technology of the present disclosure, according to various embodiments.

Embodiments of apparatus, method, and storage medium associated with MCCG memory integrity for securing/protecting memory content of VM/enclave are described herein. In some embodiments, an apparatus may include one or more encryption engines to encrypt a unit of data to be stored in a memory in response to a write operation from a VM or an enclave of an application, prior to storing the unit of data into the memory in an encrypted form; wherein to encrypt the unit of data, the one or more encryption engines are to encrypt the unit of data using at least a key domain selector associated with the VM or enclave, and a tweak based on a color within a color group associated with the VM or enclave. Resultantly, memory integrity may be separately maintained for different VM or enclaves. These and other aspects will be more fully described below.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents. Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous. Similarly, the terms "content," "data," "content/data," and the like, as used with respect to embodiments of the present disclosure, are also synonymous As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs having machine instructions (generated from an assembler and/or a compiler), a combinational logic circuit, and/or other suitable components having logic that provide the described functionality. As used herein, the term "pseudo decrypt" refers to decryption operation that leads to an obfuscated or disguised version of the plaintext, as opposed to the plaintext itself Referring now to FIG. 1, wherein a computer device having the MCCG memory integrity technology of the present disclosure, according to various embodiments, is shown. As illustrated, in embodiments, computer device 100 may include hardware 101, firmware (FW)/basic input/output services (BIOS) 113, virtual machine monitor (VMM) 118 and virtual machines (VM) 110, communicatively coupled with each other as shown. Hardware 101 may include one or more processors 102, each having one or more cores and/or one or more levels of cache 108, memory controller 103, memory 104, and I/O and other devices 111 configured to host the operation/execution of firmware (FW)/basic input/output services (BIOS) 113, VMM 118 and VM 110. Further, hardware 101 may further include MCCG memory integrity arrangement 109 incorporated with the MCCG memory integrity technology of the present disclosure to secure/protect content/data stored in memory 104 on a VM 110 or enclave 115 basis. That is, memory protection/integrity of different VM 110 or enclaves 115 are isolated. In embodiments, computer device 100 may be a cloud server configured to host VM 110 for a plurality of remote clients.

In embodiments, each processor core may be configured to support a plurality of its virtualization, virtual processors 116, for allocation to VM 110. Each processor core may also be configured to support applications 114 of VM 110 having isolated, hardware protected execution enclaves 115. In embodiments, memory 104 may be viewed by software as organized, e.g., into a number of physical memory pages 106, each having a plurality of cache lines of data. Memory controller 103 may be configured to manage and control access of memory 104 by applications 114 of VM 110 (including enclaves 115). In embodiments, memory 104 may be accessed (written into or read from) on a cache line granularity (less than a memory page 106). In other embodiments, memory 104 may be accessed (written into or read from) on a granularity larger or smaller than a cache line. In embodiments, processor(s) 102, including cores and caches 108, and memory controller 103 may be disposed in a single integrated circuit.

Figures 5, 6:
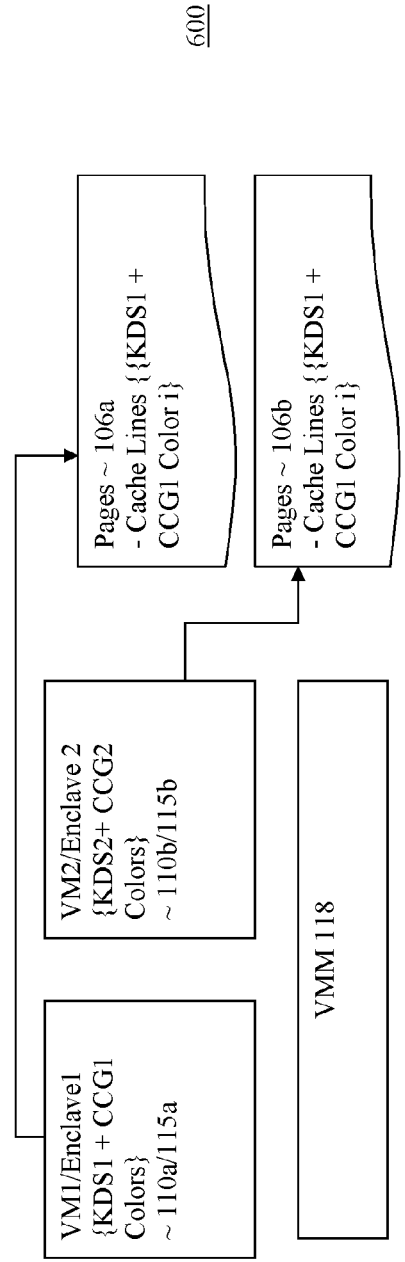
FIG. 5 illustrates a data structure of VM or enclave key domain selectors, according to various embodiments.
FIG. 6 illustrates isolation of memory protection under different color groups for VM or enclaves, according to various embodiments.

In embodiments, MCCG memory integrity arrangement 109 are configured to provide the separate/isolated memory protection/integrity of different VM 110 or enclaves 115, with different key domain selectors and crypto color groups (each having a plurality of crypto colors) being employed for protecting and maintain integrity of data stored in memory 104 for different VM 110 or enclaves 115 (see FIG. 6). In embodiments, the key domain selectors and crypto color groups (and their colors) employed are shielded from VMM 118. Further, parts of MCCG memory integrity arrangement 109 may be disposed with processor(s) 102, while other parts may be disposed with memory controller 103. In other embodiments, MCCG memory integrity arrangement 109 may be an independent component, separate from, and disposed in between processor(s) 102 and memory controller 103, on the same or different integrated circuits.

Continuing to refer to FIG. 1, in embodiments, MCCG memory integrity arrangement 109 may be configured with one or more encryption engines 105 to encrypt each unit of data (e.g., a cache line) to be stored into memory 104 employing a key domain selector and a tweak based on a crypto color of a color group associated with the VM or enclave storing the unit of data, and one or more decryption engines 107 to decrypt each unit of data (e.g., a cache line) to be read back into memory 104, employing a key domain selector and a tweak based on a crypto color. The decryption and recovery of the data would be successfully only if the key domain selector and the tweak/crypto color used in decryption match the key domain selector and the tweak/crypto color used in encryption (which are VM/enclave specific).

The tweaks based on the crypto colors may be used in any one of a number of manners to affect the cryptographic key or the way the encryption process is performed, e.g., but not limited to (i) as a tweak value used as in tweakable block cipher; (ii) as a value that impact the key generation process where the bits of the selectors are diffused into the bits of the cryptographic key; (iii) as the actual cryptographic key itself; and (iv) as a selector used for accessing the appropriate key from a lookup table. In embodiments, where a selector is used to identify a key, the corresponding keys of the selectors can be independently updated.

In embodiments, MCCG memory integrity arrangement 109 may be configured to support the MCCG memory integrity at the VM level, while other embodiments may be configured to support the MCCG memory integrity at the application enclave level. In embodiments, the level at which MCCG memory integrity arrangement 109 supports MCCG memory integrity may be configurable by a system administrator of computer device 100. These and other aspects of MCCG memory integrity will be further described below after further description of computer device 100.

In embodiments, MCCG memory integrity arrangement 109 may be configured to maintain a data structure 500 of the key domain selectors 504a-504n associated with the various VM 110 or enclaves 115. In embodiments, data structure 500 may include a plurality of VM/enclave identifiers 502a-502n identifying a plurality of corresponding VM/enclaves 110/115, and the key domain selectors 504a-504n associated with the identified VM/enclaves 110/115 (see FIG. 5). Data structure 500 may further include other information 506a-506n associated with the identified VM/enclaves 110/115. The key domain selectors 504a-504n associated with the identified VM/enclaves 110/115 may be provided to MCCG memory integrity arrangement 109 in a number of manners. In embodiments where computer device 100 is a cloud computer server hosting VM 110 for various remote clients, the key domain selector associated with a VM may be provided by the corresponding client for whom the VM is instantiated. Provision of a key domain selector by a client to a cloud computer server for maintaining memory integrity of the client's VM memory is further described in U.S. Provisional Patent Application 62/373,627, entitled "Secure Public Cloud," filed on Aug. 11, 2016, which specification is hereby fully incorporated by reference.

Figure 2:
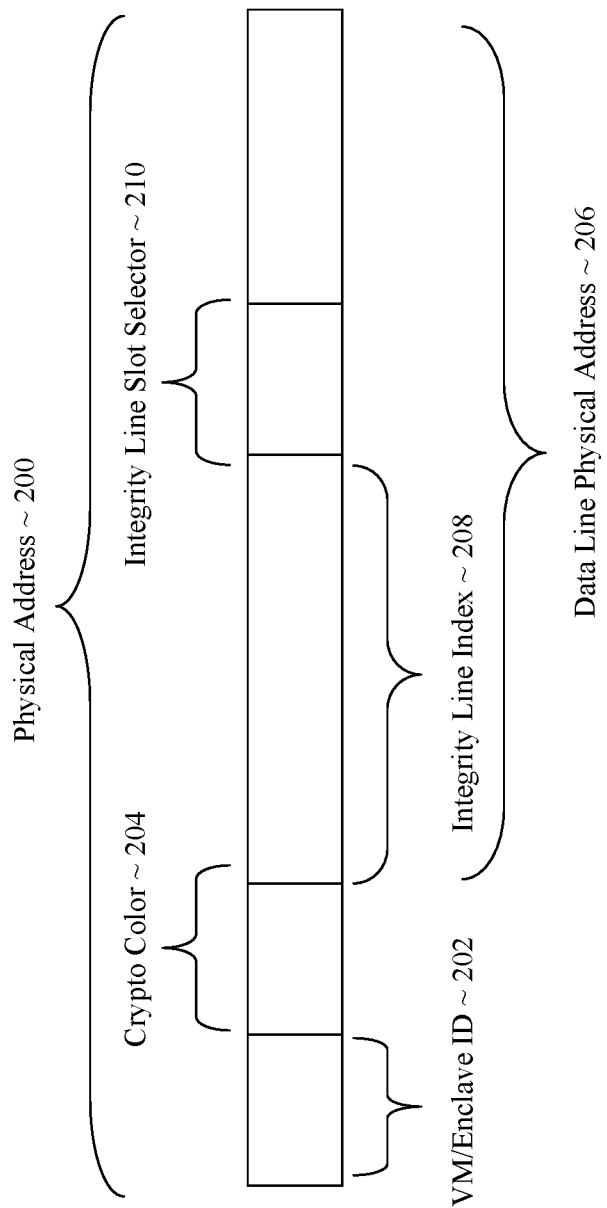
FIG. 2 illustrates a physical address, according to various embodiments.

In embodiments, MCCG memory integrity arrangement 109 may be configured to support receipt of the crypto color 204 for tweak selection, through unused address bits of a physical address 200 (FIG. 2). In other embodiments, MCCG memory integrity arrangement 109 may be configured to support receipt of crypto color 204 through other means, such as meta data. Passing crypto color 204 for tweak selection through unused address bits of a physical address 200 (FIG. 2) is the subject of U.S. Application co-pending U.S. patent application Ser. No. 15/089,140, entitled "Convolutional Memory Integrity," filed on Apr. 1, 2016, which Specification is hereby incorporated by reference. In some embodiments where meta data are used to pass crypto color 204, the meta data may be passed as part of a compressed cache line, with the encrypted data within the cache line being compressed to provide room for the meta data. Various techniques to compress encrypted data within a cache line are further described in co-pending U.S. patent application Ser. No. 14/998,323, entitled "Using Compression to Enable Near Zero Bandwidth Memory Integrity and Counter-Mode Encryption for Intel's TEE," filed on Dec. 24, 2015, which Specification is hereby incorporated by reference.

Figures 3, 4:
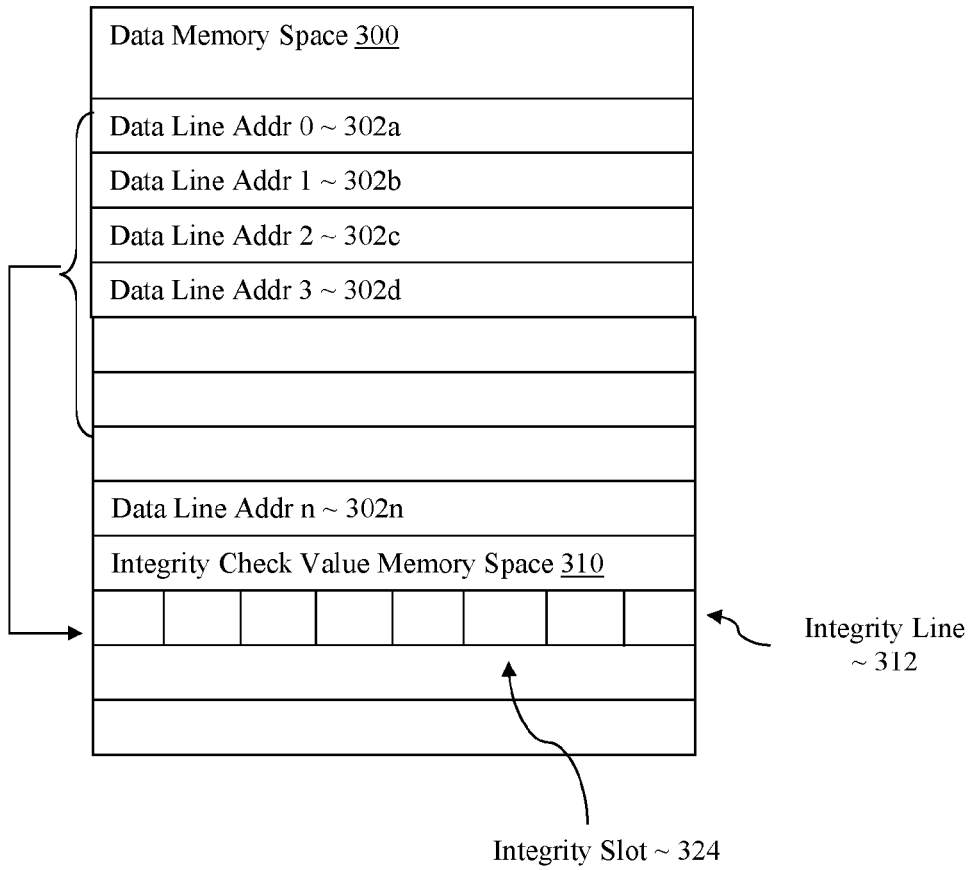
FIG. 3 illustrates an abbreviated view of memory space, according to various embodiments.
FIG. 4 illustrates a data structure of color groups, according to various embodiments.

In embodiments, MCCG memory integrity arrangement 109 may be configured to compute and store integrity check values for each unit of data (e.g., a cache line of data) being stored into memory 104, and conditionally check the integrity check value, when reading each unit of data (e.g., a cache line of data) back from memory 104. FIG. 3 illustrates a logical view of memory 104, having data memory space 300 with various data lines 302a-302n and integrity check value memory space 310 with a number of integrity lines 312, each having a number of integrity slots 314 for storing the integrity check values. In embodiments, the integrity line 312 and integrity slot 314 of each data line 302* (denoting one of 302a-302n) may be similarly identified in a number of address bits, such as integrity line index bits 208 and integrity line slot selector 210 of physical address 200 (FIG. 2). Conditional integrity check is further described in U.S. Pat. No. 9,213,653, entitled "Memory Integrity," issued on Dec. 15, 2015. The specification of U.S. Pat. No. 9,213,653 is hereby fully incorporated by reference.

Still referring to FIG. 1, each VM 110, in addition to virtual processors 116 that are virtualization of the cores of processors 102, may further include operating system (OS) 112 (which may be referred as guest OS), and applications 114. VMM 118 may be configured to manage operation of VM 110, including, but is not limited to, virtual memory to physical memory mapping. VMM 118 may include page table 122 configured to map VM-physical memory pages/addresses of the VM 110 to host physical memory pages/addresses 107 of memory 104. In embodiments, page table 122 may be implemented and referred to as second level address translation table (SLAT) or extended page table (EPT).

OS 112 may include a number of services and utilities 130, and translation table 128. In particular, services and utilities 130 may include memory allocation and deallocation functions, such as malloc( ) and free( ), to service memory allocation requests and free allocated memory requests of applications 114 (including memory allocation requests and free allocated memory requests from code executing within enclaves 115) of corresponding VM 110. The memory allocation and deallocation functions, such as malloc( ) and free( ), may be collectively referred to as a memory manager. In embodiments, the memory manager of each guest OS 112 of the different VM 110 operates independent of each other.

In embodiments, to exploit the MCCG memory integrity function of MCCG memory integrity arrangement 109, the memory manager of OS 112 may be configured to associate a crypto color group with a plurality of crypto colors to the corresponding VM 110 or each enclave 115 of application 114 of the VM 110, depending on whether the separate/isolated memory integrity is to be provided at a VM or enclave basis. In embodiments, to support provision of separate/isolated memory integrity at an enclave basis, the memory manager of a guest OS 112 may be further configured to maintain a data structure 400 having a number of crypto color group identifiers 402a-402n, identifying corresponding crypto color groups (each having a number of crypto colors), and the identifications 404a-404n of the enclaves 115 allocated the identified crypto color groups, for use to service memory requests from enclaves 115 of applications 114 of the corresponding VM 110 (see FIG. 4).

Still referring to FIG. 1, translation table 128 of OS 112 may be configured to map virtual memory pages/addresses of a VM 110 to VM-physical memory pages/addresses of the VM 110. Except from being benefited from the MCCG memory integrity technology of the present disclosure, VMM 118, VM 110, OS 112 and applications 114 may be any one of such elements known in the art. For examples, OS 112 may be Windows OS from Microsoft® Corporation, or UNIX/Linux available from various providers. Similarly, FW/BIOS 113 may be any one of a number FW/BIOS known in the art. In embodiments, FW/BIOS 113 may include support for Unified Extensible Firmware Interface (UEFI).

Likewise, except for the MCCG memory integrity technology of the present disclosure, processor(s) 102 may be any one of a number of processors known in the art. Similarly, except for the MCCG memory integrity technology of the present disclosure, memory controller 103 may be any one of a number of memory controllers known in the art. Memory 104 may be any volatile or non-volatile memory known in the art, suitable for storing content/data.

Examples of I/O and other devices 111 may include communication or networking interfaces, such as Ethernet, WiFi, 3G/4G, Bluetooth®, Near Field Communication, Universal Serial Bus (USB) and so forth, storage devices, such as solid state, magnetic and/or optical drives, input devices, such as keyboard, mouse, touch sensitive screen, and so forth, and output devices, such as, display devices, printers, and so forth.

In embodiments, MCCG memory integrity arrangement 109 may be further configured to employ split diffusion of the key domain selectors and the crypto colors when encrypting data being stored into memory 104 or decrypting data being read out of memory 104. That is, MCCG memory integrity arrangement 109 may be configured with a plurality of encryption engines 105 to encrypt each unit of content/data to be stored into memory 104, over a plurality of stages using a plurality of selectors of different types $\{s_1, s_2, \ldots\}$, and a plurality of decryption engines 107, where one or more of the plurality of decryption engines 107 may fully decrypt, partially decrypt or pseudo decrypt encrypted unit of content/data from memory 104, over one or more stages, using at least a subset of the plurality of selectors of different types $\{s_1, s_2, \ldots\}$. In embodiments, in each stage, a single type of selector $s_i$ and a single type of encryption/decryption algorithm, approach or technique are used for each unit of data.

Figure 7:
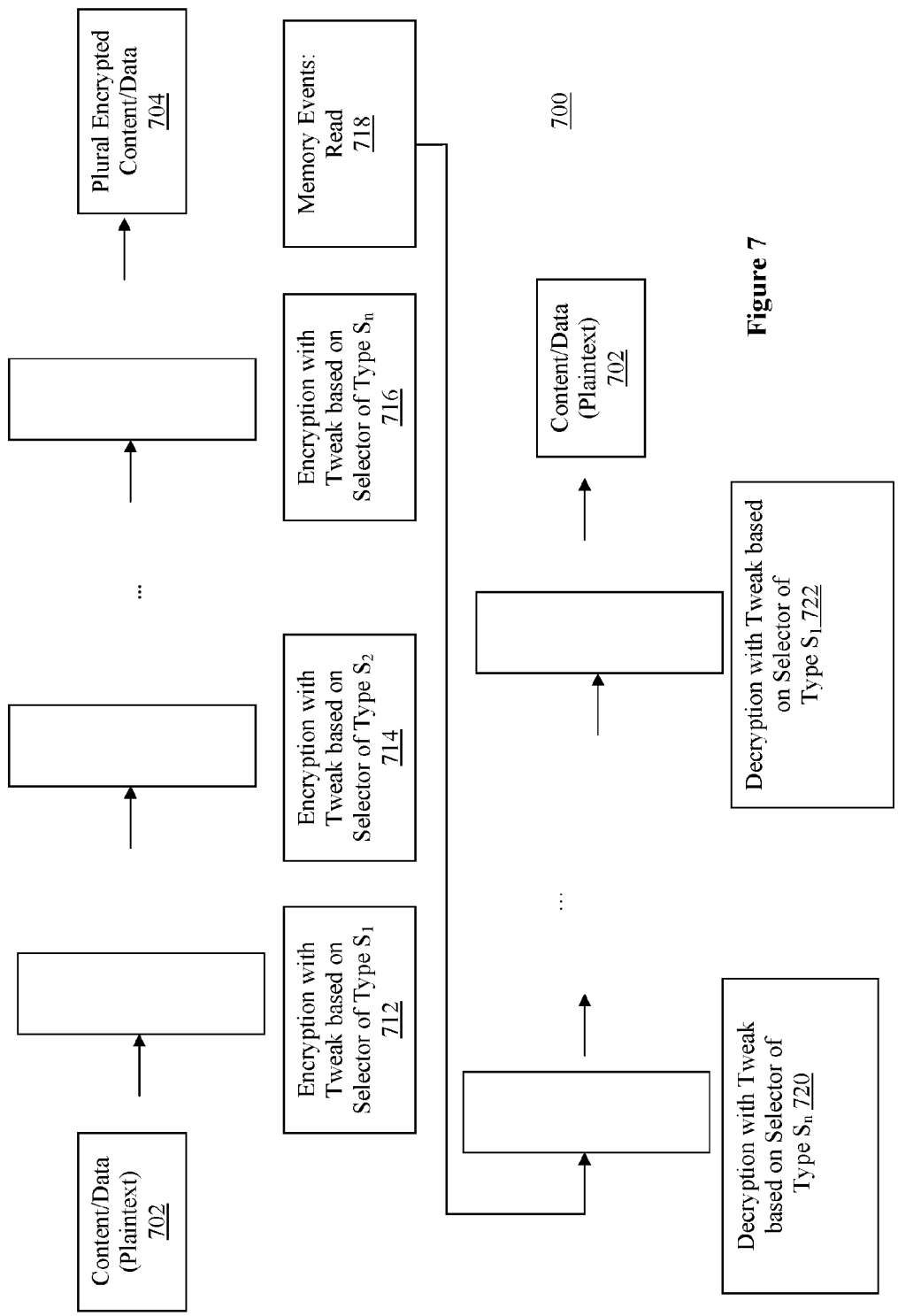
FIG. 7 illustrates an overview of the multi-stage (diffusion) memory integrity arrangement, according to various embodiments.

Referring now also to FIG. 7, wherein an overview of the multi-stage (split-diffusion) memory integrity technology, according to various embodiments, is illustrated. As shown, process 700 for ensuring integrity of content/data stored in memory may include having each unit of one or more units of content/data (in plaintext) 702, to be written into memory 104 successively encrypted, e.g., by a plurality of encryption engines 105, over a plurality of encryption stages 712, 714, ... 716, using a plurality of tweaks based on a plurality of selectors of different types $\{s_1, s_2, \ldots s_n\}$, into plural encrypted content/data 704, prior to storing each unit into memory 104. In embodiments, in each stage, a single type of selector $s_i$ and/or a single type of encryption/decryption may be used for each unit of content/data. At each stage, the selector type based tweak may be used in any one of a number of manners, as described earlier, to affect the cryptographic key or the way the encryption process is performed.

For encryption/decryption, at each stage, the encryption/decryption may be any one of a number of encryption/decryption algorithms, approaches or techniques, known in the art, including, but are not limited to, Advanced Encryption Standard (AES), ThreeFish, Triple Data Encryption Standard (3DES), Speck, Simon, Prince, and so forth. For AES encryption/decryptions, the ciphers may be, but are not limited to, electronic codebook (ECB) mode ciphers, Xor-encrypt-xor (XEX)-based tweaked-codebook mode with cipher text stealing (XTS) block ciphers, Liskow Rivest Wagner (LRW) ciphers or cipher block chaining (CBC) ciphers.

Additionally, in response to a read memory event 718, process 700 may include decrypting 720 each plural encrypted unit of content/data 704, e.g., by a corresponding plurality of decryption engines 107, over a plurality decryption stages 720, using a corresponding plurality of tweaks based on the plurality of selectors of different types $\{s_1, s_2, \ldots\}$, in reverse order of encryption, to generate and recover plaintext content/data 702. Similarly, in each stage, a single type of selector $s_i$ corresponding to the selector type used for encryption, may be used for each unit of content/data, and the tweak may be used in a manner similar to encryption during the same stage. Diffusion of the cryptographic combination of the selector/color value with the content/data is further description in U.S. patent application Ser. No. 15/263,962, entitled "Multi-stage Memory Integrity Method and Apparatus" filed Sep. 13, 2016, which specification is hereby fully incorporated by reference.

Before proceeding to further describe the MCCG memory integrity technology, it should be noted that while for ease of understanding, the technology has thus far and will continue to be described in the context of an example computer system with VMs and VMM, the present disclosure is not limited. The MCCG memory integrity technology may be practiced on a computer system with only a single operating OS, without any VM or VMM, providing isolated memory integrity for different application enclaves 115.

Figure 10:
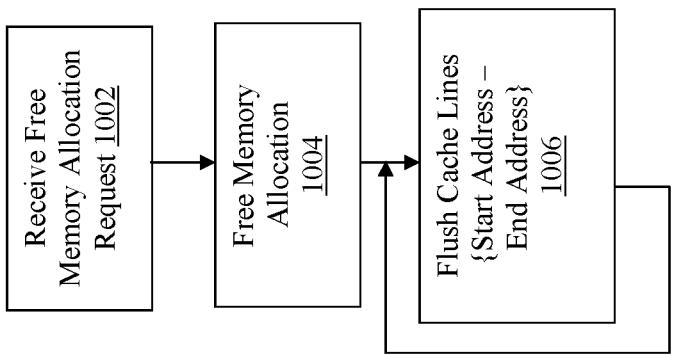
FIG. 10 illustrates an example process of a memory manager for freeing/deallocating memory, according to various embodiments
Figure 9:
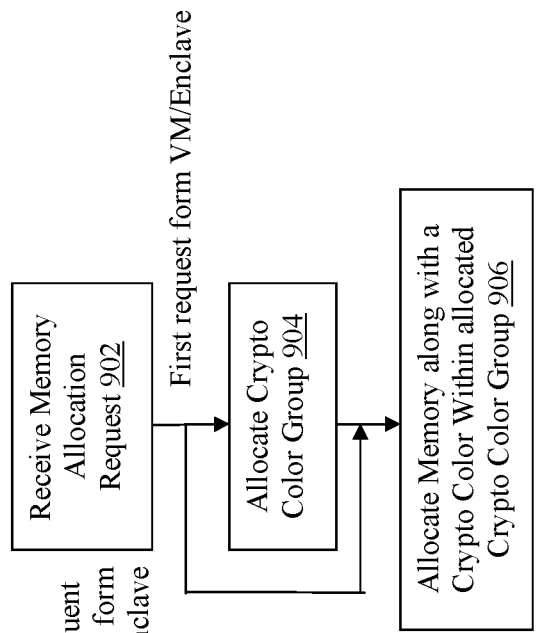
FIG. 9 illustrates an example process of a memory manager for allocating memory, according to various embodiments.
Figure 8:
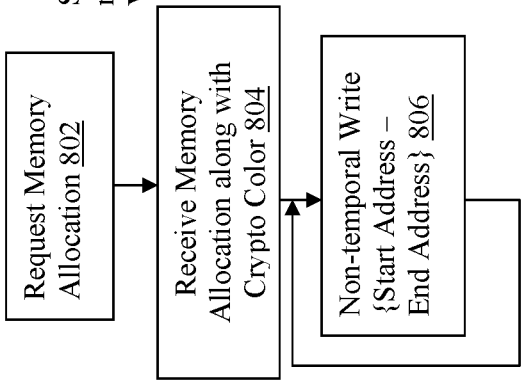
FIG. 8 illustrates an example process of an application for writing to memory, according to various embodiments.

Referring now to FIGS. 8-10, wherein various complementary processes for requesting memory allocation and freeing/deallocating memory to take advantage of the separate/isolated memory integrity on a VM/enclave basis by MCCG memory integrity arrangement are illustrated. In particular, FIG. 8 illustrates an example process of an application writing to memory, according to various embodiments. As shown, process 800 for writing to memory may include operations performed at blocks 802-806. The operations may be performed by e.g. an application 114 of VM 110, in particular, an enclave 115 of an application 114.

Process 800 may begin at block 802, wherein (an enclave 115 of) an application 114 may request the memory manager of guest OS 112 for memory allocation. The request may include e.g., an amount of memory needed, and made in any one of a number of manners known in the art. Next, at block 804, (the enclave 115 of) the application 114 may receive a memory address range of the requested allocation from the memory manager of guest OS 112, along with a crypto color of a color group (associated with the VM 110 (or the enclave 115)) for use to maintain memory integrity of the allocated memory. In embodiments, the crypto color may be embedded as part of the memory addresses of the address range of the memory allocated.

Next, at block 806, (the enclave 115 of) the application 114 may perform non-temporal write to initialize the entire allocated memory, from starting address of the memory range to the ending address, claiming ownership as well as causing the memory location of the allocated memory range to be integrity protected by MCCG memory integrity arrangement 109 with a key domain selector associated with the VM 110 and a tweak based on the crypto color associated with the VM 110 or the enclave 115.

FIG. 9 illustrates an example complementary process of a memory manager for allocating memory, according to various embodiments. Process 900 for allocating memory may include operations performed at blocks 902-906. The operations may be performed by e.g., the memory manager of OS 112.

Process 900 may start at block 902, wherein the memory manager may receive a memory allocation request from (an enclave 115 of) an application 114 of VM 110. If the memory request is a first memory request from (the enclave 115 or) the VM 110, process 900 may proceed to block 904, where the memory manager may allocate a crypto color group to (the enclave 115 or) the VM 110. In embodiments, on allocation of the crypto color group, the memory manager may update e.g., data structure 400 to track the allocation.

If the memory request is a subsequent memory request from the same or different application 114 of the same VM 110 (or same or different code segments of an enclave 115), or on allocation of a crypto color group, process 900 may proceed to block 906, where the memory manager may allocate the requested memory (e.g., from an available memory pool), along with a crypto color within the crypto color group associated with (previously allocated to) (the enclave 115 or) the VM 110. In embodiments, similarly, on allocation of a crypto color form a crypto color group, the memory manager may update e.g., data structure 400 to track the allocation.

FIG. 10 illustrates an example complementary process of a memory manager for freeing/deallocating memory, according to various embodiments, is illustrated. Process 1000 for freeing/deallocating memory may include operations performed at blocks 1002-1006. The operations may be performed by e.g., the memory manager of OS 112.

Process 1000 may start at block 1002, where the memory manager may receive a free memory allocation request from (an enclave 115 of) an application 114 of VM 110. Next, at block 1004, the memory manager may free/deallocate the previous allocated memory range. Additionally, at block 1006, the memory manager may flush all the cache lines associated with the memory locations of the memory range being freed/deallocated, from the starting address to the ending address.

Accordingly, with the features provided by MCCG memory integrity arrangement 109, and the coordinated/complementary operations performed by (enclaves 115) of applications 114 of VM 110 and the memory manager of the guest OS 112 of VM 110, the memory integrity of VM 110 or enclave 115 may be separately maintained (isolated from each other). The key domain selectors as well as the crypto colors associated with the VM 110 or enclaves 115 for memory integrity are shielded from VMM 118. The separated/isolated memory integrity protection provided to VM 110/enclaves 115 may be especially useful in detecting and/or preventing replay type of attacks (e.g., through physical memory access, compromised VMM, and so forth), since replay of the old ciphertext will trigger failures. Further, the protection may be provided without the potential overhead or limits of the prior approaches.

As will be appreciated by one skilled in the art, aspects the present disclosure, such as operations performed by applications 114 or a memory manager of OS 112 may be embodied as methods or computer program products. Accordingly, aspect of the present disclosure, in addition to being embodied in hardware (such as MCCG memory integrity arrangement 109) as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium.

Figure 11:
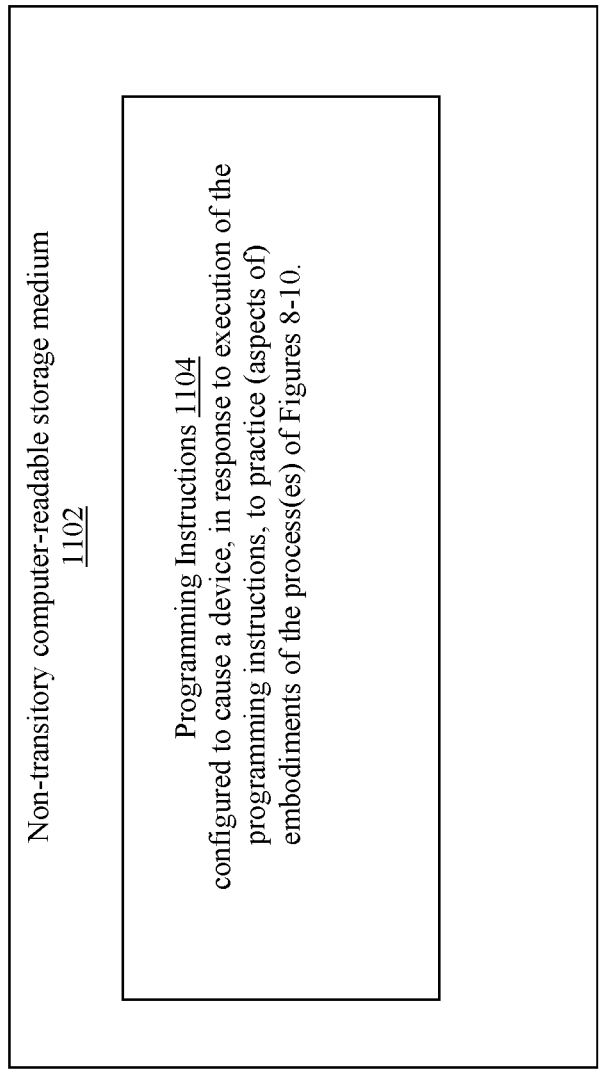
FIG. 11 illustrates a storage medium having instructions for practicing methods described with references to FIGS. 8-10, according to various embodiments.

FIG. 11 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 1102 may include a number of programming instructions 1104. Programming instructions 1104 may be configured to enable a computing device, in response to execution of the programming instructions, to implement application 114, OS 112, software embodiments of encryption engines 105 and decryption engines 107 (or portion thereof) to practice the MCCG memory integrity technology of the present disclosure. In alternate embodiments, programming instructions 1104 may be disposed on multiple computer-readable non-transitory storage media 1102 instead. In still other embodiments, programming instructions 1104 may be disposed on computer-readable transitory storage media 1102, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Thus various example embodiments of the present disclosure have been described including, but are not limited to:

Example 1 may be an apparatus for providing memory integrity, comprising: one or more encryption engines to encrypt a unit of data to be stored in a memory in response to a write operation from a virtual machine (VM) or an enclave of an application, prior to storing the unit of data into the memory in an encrypted form; wherein to encrypt the unit of data, the one or more encryption engines may encrypt the unit of data using at least a key domain selector associated with the VM or enclave, and a tweak based on a crypto color within a crypto color group associated with the VM or enclave.

Example 2 may be example 1, wherein the one or more encryption engines may receive and locally store the key domain selector associated with the VM or enclave, on initialization of the VM or enclave.

Example 3 may be example 1, wherein the one or more encryption engines may receive the crypto color within the crypto color group associated with the VM or enclave, as part of a physical address associated with the write operation denoting a location in the memory where the unit of data may be stored.

Example 4 may be example 1, wherein the one or more encryption engines may include a plurality of encryption engines to successively encrypt the unit of data in a plurality of stages using the key domain selector associated with the VM or enclave in a first of the plurality of stages, and the crypto color within the crypto color group associated with the VM or enclave in a second of the plurality of stages.

Example 5 may be example 1, further comprising: one or more decryption engines to decrypt and recover the unit of data, in response to a read operation to read the unit of data back out from the memory; wherein the one or more decryption engines may decrypt the unit of data using at least the key domain selector associated with the VM or enclave, and the tweak based on the crypto color within the crypto color group associated with the VM or enclave.

Example 6 may be example 5, wherein the one or more decryption engines may include a plurality of decryption engines to successively decrypt and recover the unit of data in a plurality of stages using the key domain selector associated with the VM or enclave in a first of the plurality of stages, and the crypto color within the crypto color group associated with the VM or enclave in a second of the plurality of stages.

Example 7 may be any one of examples 1-6, wherein the unit of data is a cache line of data Example 8 may be any one of examples 1-6, wherein the apparatus is hosted in a memory controller.

Example 9 may be an apparatus for computing, comprising memory; a processor having one or more cores, and one or more levels of cache; a memory controller coupled with the memory and the processor to control the memory; and a memory integrity arrangement that may include: one or more encryption engines to encrypt a cache line of data to be stored in the memory in response to a write operation from a virtual machine (VM) or an enclave of an application being executed by the one or more cores, prior to storing the cache line of data into the memory in an encrypted form; wherein to encrypt the cache line of data, the one or more encryption engines may encrypt the cache line of data using at least a key domain selector associated with the VM or enclave, and a tweak based on a crypto color within a crypto color group associated with the VM or enclave; and one or more decryption engines to decrypt and recover the cache line of data, in response to a read operation to read the cache line of data back out from the memory; wherein the one or more decryption engines may decrypt the cache line of data using at least the key domain selector associated with the VM or enclave, and the tweak based on the crypto color within the crypto color group associated with the VM or enclave.

Example 10 may be example 9, wherein the memory integrity arrangement may receive and locally store the key domain selector associated with the VM or enclave, on initialization of the VM or enclave.

Example 11 may be example 9, wherein the memory integrity arrangement may receive the crypto color within the crypto color group associated with the VM or enclave, as part of a physical address associated with the write or read operation denoting a location in the memory where the unit of data may be stored.

Example 12 may be example 9, wherein the memory controller may further check a decrypted cache line of data for corruption.

Example 13 may be example 12, wherein to facilitate checking of a decrypted cache line of data for corruption, the memory controller may further compute an integrity check value for the cache line of data, when the cache line of data in encrypted form is stored into the memory.

Example 14 may be example 13, wherein the memory controller may compute the integrity check value for the cache line of data based only on bits of the data and the encrypted cache line of data that depend only on the key domain selector.

Example 15 may be example 13, wherein the memory controller may compute the integrity check value for the cache line of data based only on bits of the encrypted cache line of data.

Example 16 may be any one of examples 9-15, wherein the memory integrity arrangement and the memory controller are co-disposed with the cores of the processor, in a single integrated circuit package.

Example 17 may be a method for providing memory integrity, comprising: requesting a memory manager of a guest operating system of a virtual machine (VM), by an application of the virtual machine, for allocation of a block of data memory space in a memory to the application; receiving from the memory manager, by the application, allocation of the requested block of data memory space, including receiving a crypto color that is a member of a crypto color group that is associated with the VM or an enclave of the application, on which behalf the block of data memory space is being requested, wherein the crypto color may be used during encryption of data to be written into the block of data memory space; and performing, by the application, non-temporal write of data to the allocated block of data memory space using the crypto color, wherein the data are encrypted using at least the crypto color and a key domain selector associated with the VM or the enclave, prior to being stored into the block of data memory space.

Example 18 may be example 17 further comprising: subsequently reading back, by the application, the data from the allocated block of data memory space using the crypto color; wherein the data are decrypted and recovered using at least the crypto color and the key domain selector associated with the VM or the enclave.

Example 19 may be one or more computer-readable media comprising instructions that cause a guest operating of a virtual machine, in response to execution of the instructions by one or more processor cores of a computer device hosting the virtual machine, to operate a memory manager, to: receive a request from an application of the virtual machine, for allocation of a block of data memory space in a memory of the computer device to the application; and allocate to the application the requested block of data memory space, including assigning and providing a crypto color that is a member of a crypto color group that is associated with the VM or an enclave of the application, on which behalf the block of data memory space is being requested, wherein the crypto color may be used during encryption of data to be written into the block of data memory space.

Example 20 may be example 19, wherein the memory manager may be further operated to associate the crypto color group with the VM or an enclave of the application, on receipt of a first request for memory allocation from the application or the VM.

Example 21 may be example 19, wherein the memory manager may be further operated to receive a request to free the allocated block of data memory space, and in response, flush a plurality of cache lines caching the data stored in the allocated block of data memory space.

Example 22 may be an apparatus for providing memory integrity, comprising: means for encrypting a cache line of data to be stored in the memory in response to a write operation from a virtual machine (VM) or an enclave of an application, prior to storing the cache line of data into the memory in an encrypted form; including means for encrypting the cache line of data using at least a key domain selector associated with the VM or enclave, and a tweak based on a crypto color within a crypto color group associated with the VM or enclave; and means for decrypting and recovering the cache line of data, in response to a read operation to read the cache line of data back out from the memory; wherein means for decrypting may include means for decrypting the cache line of data using at least the key domain selector associated with the VM or enclave, and the tweak based on the crypto color within the crypto color group associated with the VM or enclave.

Example 23 may be example 22, wherein means for encrypting may comprise means for receiving and locally storing the key domain selector associated with the VM or enclave, on initialization of the VM or enclave.

Example 24 may be example 22, wherein means for encrypting may comprise means for receiving the crypto color within the crypto color group associated with the VM or enclave, as part of a physical address associated with the write operation denoting a location in the memory where the unit of data may be stored.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:
1. An apparatus for providing memory integrity, comprising:
one or more encryption engines to encrypt a unit of data to be stored in a memory in response to a write operation from a virtual machine (VM) or an enclave of an application, prior to storing the unit of data into the memory in an encrypted form; wherein to encrypt the unit of data, the one or more encryption engines are to encrypt the unit of data using at least a key domain selector associated with the VM or enclave, and a tweak based on a crypto color within a crypto color group associated with the VM or enclave.

2. The apparatus of claim 1, wherein the one or more encryption engines are to receive and locally store the key domain selector associated with the VM or enclave, on initialization of the VM or enclave.

3. The apparatus of claim 1, wherein the one or more encryption engines are to receive the crypto color within the crypto color group associated with the VM or enclave, as part of a physical address associated with the write operation denoting a location in the memory where the unit of data is to be stored.

4. The apparatus of claim 1, wherein the one or more encryption engines includes a plurality of encryption engines to successively encrypt the unit of data in a plurality of stages using the key domain selector associated with the VM or enclave in a first of the plurality of stages, and the crypto color within the crypto color group associated with the VM or enclave in a second of the plurality of stages.

5. The apparatus of claim 1, further comprising:
one or more decryption engines to decrypt and recover the unit of data, in response to a read operation to read the unit of data back out from the memory;
wherein the one or more decryption engines are to decrypt the unit of data using at least the key domain selector associated with the VM or enclave, and the tweak based on the crypto color within the crypto color group associated with the VM or enclave.

6. The apparatus of claim 5, wherein the one or more decryption engines includes a plurality of decryption engines to successively decrypt and recover the unit of data in a plurality of stages using the key domain selector associated with the VM or enclave in a first of the plurality of stages, and the crypto color within the crypto color group associated with the VM or enclave in a second of the plurality of stages.

7. The apparatus of claim 1, wherein the unit of data is a cache line of data.

8. The apparatus of claim 1, wherein the apparatus is hosted in a memory controller.

9. An apparatus for computing, comprising:
memory;
a processor having one or more cores, and one or more levels of cache;
a memory controller coupled with the memory and the processor to control the memory; and
a memory integrity arrangement that includes:
one or more encryption engines to encrypt a cache line of data to be stored in the memory in response to a write operation from a virtual machine (VM) or an enclave of an application being executed by the one or more cores, prior to storing the cache line of data into the memory in an encrypted form; wherein to encrypt the cache line of data, the one or more encryption engines are to encrypt the cache line of data using at least a key domain selector associated with the VM or enclave, and a tweak based on a crypto color within a crypto color group associated with the VM or enclave; and
one or more decryption engines to decrypt and recover the cache line of data, in response to a read operation to read the cache line of data back out from the memory; wherein the one or more decryption engines are to decrypt the cache line of data using at least the key domain selector associated with the VM or enclave, and the tweak based on the crypto color within the crypto color group associated with the VM or enclave.

10. The apparatus of claim 9, wherein the memory integrity arrangement is to receive and locally store the key domain selector associated with the VM or enclave, on initialization of the VM or enclave.

11. The apparatus of claim 9, wherein the memory integrity arrangement is to receive the crypto color within the crypto color group associated with the VM or enclave, as part of a physical address associated with the write or read operation denoting a location in the memory where a unit of data is to be stored.

12. The apparatus of claim 9, wherein the memory controller is to further check a decrypted cache line of data for corruption.

13. The apparatus of claim 12, wherein to facilitate checking of a decrypted cache line of data for corruption, the memory controller is to further compute an integrity check value for the cache line of data, when the cache line of data in encrypted form is stored into the memory.

14. The apparatus of claim 13, wherein the memory controller is to compute the integrity check value for the cache line of data based only on bits of the data and the encrypted cache line of data that depend only on the key domain selector.

15. The apparatus of claim 13, wherein the memory controller is to compute the integrity check value for the cache line of data based only on bits of the encrypted cache line of data.

16. The apparatus of claim 9, wherein the memory integrity arrangement and the memory controller are co-disposed with the cores of the processor, in a single integrated circuit package.

17. A method for providing memory integrity, comprising:
requesting a memory manager of a guest operating system of a virtual machine (VM), by an application of the virtual machine, for allocation of a block of data memory space in a memory to the application;
receiving from the memory manager, by the application, allocation of the requested block of data memory space, including receiving a crypto color that is a member of a crypto color group that is associated with the VM or an enclave of the application, on which behalf the block of data memory space is being requested, wherein the crypto color is to be used during encryption of data to be written into the block of data memory space; and
performing, by the application, non-temporal write of data to the allocated block of data memory space using the crypto color, wherein the data are encrypted using at least the crypto color and a key domain selector associated with the VM or the enclave, prior to being stored into the block of data memory space.

18. The method of claim 17, further comprising:
subsequently reading back, by the application, the data from the allocated block of data memory space using the crypto color; wherein the data are decrypted and recovered using at least the crypto color and the key domain selector associated with the VM or the enclave.

19. One or more non-transitory computer-readable media comprising instructions that cause a guest operating system of a virtual machine (VM), in response to execution of the instructions by one or more processor cores of a computer device hosting the virtual machine, to operate a memory manager, to:
receive a request from an application of the virtual machine, for allocation of a block of data memory space in a memory of the computer device to the application; and
allocate to the application the requested block of data memory space, including assigning and providing a crypto color that is a member of a crypto color group that is associated with the VM or an enclave of the application, on which behalf the block of data memory space is being requested, wherein the crypto color is to be used during encryption of data to be written into the block of data memory space.

20. The one or more computer-readable media of claim 19, wherein the memory manager is further operated to associate the crypto color group with the VM or an enclave of the application, on receipt of a first request for memory allocation from the application or the VM.

21. The one or more computer-readable media of claim 19, wherein the memory manager is further operated to receive a request to free the allocated block of data memory space, and in response, flush a plurality of cache lines caching the data stored in the allocated block of data memory space.

* * * * *

UNITED STATES PATENT AND TRADEMARK OFFICE
CERTIFICATE OF CORRECTION

PATENT NO. : 10,235,304 B2
APPLICATION NO. : 15/283339
DATED : March 19, 2019
INVENTOR(S) : David M. Durham et al.

Page 1 of 1

It is certified that error appears in the above-identified patent and that said Letters Patent is hereby corrected as shown below:

On the Title Page

Item (72) Third Listed Inventor, "Serge J. Deutsch, Hillsboro, OR (US)." Should read --Sergej Deutsch, Hillsboro, OR (US)--.

Signed and Sealed this
Twenty-fifth Day of June, 2019

Andrei Iancu
*Director of the United States Patent and Trademark Office*